Dec. 15, 1964    P. A. LATHAM    3,161,170
SAILING VEHICLE

Filed Jan. 11, 1963    3 Sheets-Sheet 1

INVENTOR.
PETER A. LATHAM
BY
Ezekiel Wolf, Wolf + Greenfield
ATTORNEYS

Dec. 15, 1964
P. A. LATHAM
3,161,170
SAILING VEHICLE
Filed Jan. 11, 1963
3 Sheets-Sheet 2
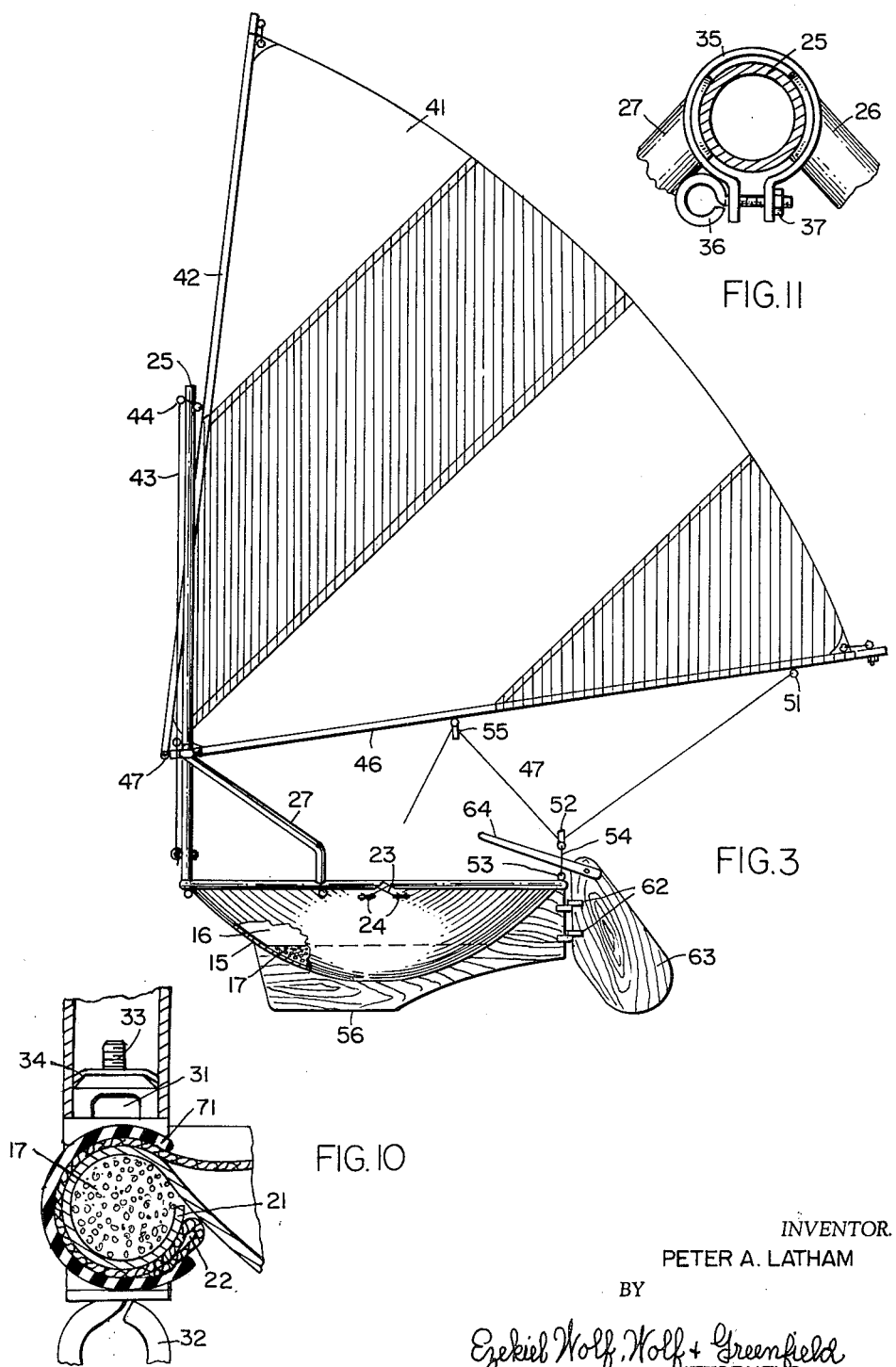
INVENTOR.
PETER A. LATHAM
BY
Ezekiel Wolf, Wolf + Greenfield
ATTORNEYS Dec. 15, 1964   P. A. LATHAM   3,161,170
SAILING VEHICLE
Filed Jan. 11, 1963   3 Sheets-Sheet 3

INVENTOR.
PETER A. LATHAM
BY
Ezekiel Wolf, Wolf & Greenfield
ATTORNEYS

United States Patent Office 3,161,170
Patented Dec. 15, 1964

3,161,170
SAILING VEHICLE
Peter A. Latham, Hawthorne Lane, Concord, Mass.
Filed Jan. 11, 1963, Ser. No. 250,934
11 Claims. (Cl. 114—39)

The present invention relates in general to vehicles and more particularly concerns a novel lightweight sailing vehicle which is relatively easy to fabricate, to transport via an automobile to the beach and over the beach to the water, to assemble, and to sail while comfortably accommodating either one or two persons with relatively good stability and while traveling at relatively high speeds. Still another feature of the invention resides in its relative safety and ease with which it may be launched from the beach and carried to deeper water.

The satisfaction of quietly moving over a body of water from one point to another has led to a great increase in the popularity of sailing. Yet, the large size of most sailboats capable of moving at a good speed has dictated a requirement that most fast sailboats be moored at or near the water during the sailing season. The expense of buying and maintaining such vessels places a heavy burden on a person of modest income who owns such a sailing vessel. Accordingly, the introduction of the well-known "sailfish" met with wide acceptance because it could be transported relatively easily along the land, launched from a beach and yet sailed at relatively fast speeds.

Still the sailfish has a number of shortcomings. It is heavy, relatively expensive and the hard deck is relatively uncomfortable for extended periods of sailing. While the deck of the sailfish accommodates two people, they must shift to the windward side to keep the boat from tipping over. That means that both people must occupy a small portion of the already limited deck area.

Accordingly, it is an important object of the present invention to provide a lightweight low-cost sailing vehicle capable of accommodating two people comfortably for long periods of sailing while efficiently utilizing the available deck area.

It is another object of the invention to provide a sailing vehicle in accordance with the preceding object which is easy to transport over land by means of a small automobile and over a beach by a single person.

It is another object of the invention to achieve the preceding objects with a structure that is very durable while being relatively easy and inexpensive to fabricate and assemble. It is still another object of the invention to achieve the preceding objects with a structure relatively easy to launch from the beach by a single person.

It is still another object of the invention to achieve the preceding objects with a vehicle readily adaptable for use as a sailboat, an ice boat, or child's paddle boat.

According to the invention, means define a dish comprising a hull having a convex outside face, an inside concave face and a circumferential lip at the perimeter of the convex face surrounding the edge of the concave face. A flexible sheet of material covers the opening exposing the inside concave face. Means secure the perimeter of the sheet over the lip so that pressure on the sheet directed toward the concave face increases the pressure exerted on the lip by the edge of the sheet to establish both a substantially watertight compartment between the sheet and the concave face and a comfortable air-mattress type deck.

During sailing, there is at least one planar stabilizing member located in a plane generally perpendicular to the hull surface as is a bisecting plane which divides the concave and convex faces into equal area faces symmetrical about the latter plane, the planar stabilizing member being secured to the outside convex face and extending away from the concave face. Mast means extend from the lip away from the sheet substantially in the bisecting plane. Rudder means extend away from the convex face substantially in the bisecting plane at the end of the dish defining means away from where the mast means extend from the lip.

One feature of the invention resides in means functioning as a tire and bumper of generally U-shaped cross section fitting over the sheet edge and the lip. Handle means pivotally attached along the axis of the dish facilitate translating the dish defining means across the beach while it rolls on its rim.

Still another feature of the invention resides in providing a pair of spaced generally parallel stabilizing members functioning both to keep the vehicle upright during sailing and as runners during ice boating.

Numerous other features, objects and advantages of the invention will become apparent from the following specification when read in connection with the accompanying drawing in which:

FIG. 3 is a side view of a sailing vehicle according to the invention with a portion of the hull cut away to expose buoyant foam helpful in keeping the vehicle afloat under all conditions;

FIG. 10 shows a detail of means for attaching the mast and side supports to the lip of the hull;

FIG. 11 shows a detail of the means for securing the ends of the side supports to the mast.

Figure 1:
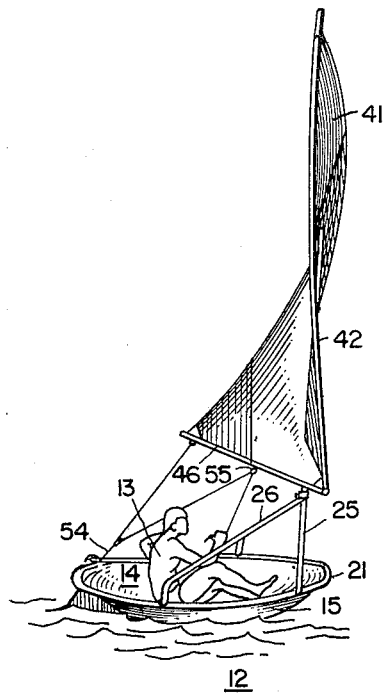
FIG. 1 shows a vehicle according to the invention sailing.
Figure 4:
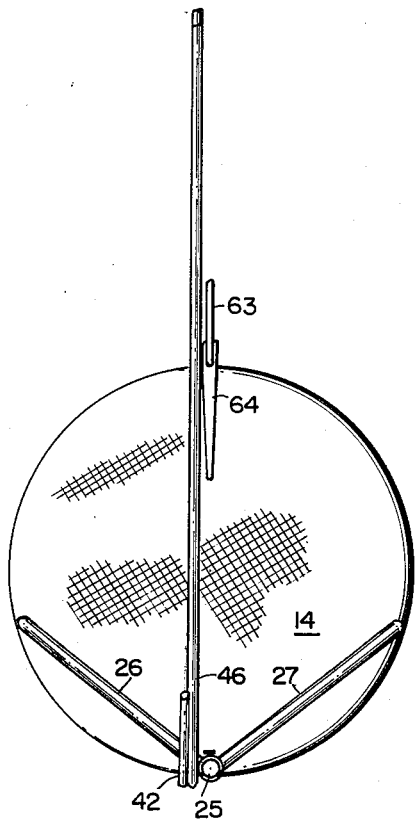
FIG. 4 is a top view of the vehicle with the sail off.

With reference now to the drawing and more particularly FIG. 1 thereof, there is illustrated a sailing vehicle 11 according to the invention sailing on the water 12 and supporting the sailor 13 on the flexible deck 14. The vehicle 11 may comprise a spun aluminum or molded plastic dish having a convex outside face 15, an inside concave face (FIG. 3) covered by the flexible sheet 14, preferably made of vinyl-coated nylon, or other flexible waterproof material. As best seen in FIG. 3, the bottom inside portion of the hull is filled with flotation material 17 to keep the vessel afloat should a leak develop in sheet 14 allowing water to fill the hull. The hollow compartment between the deck sheet 14 and the inside face 16 keeps the vessel so buoyant that it rides high and minimizes the resistance of the vessel in the water. The symmetrical shape of the hull allows for a minimum wetted surface and shallow curved shape, reducing the resistance so that the vessel moves rapidly through the water.

The axially symmetrical hull shape permits the dish to be spun aluminum, thereby achieving a number of advantages. First, fabrication costs are low yet the hull structure is strong enough to support a mast carrying large sail area while being light enough so that the hull still rides high in the water.

Figure 2:
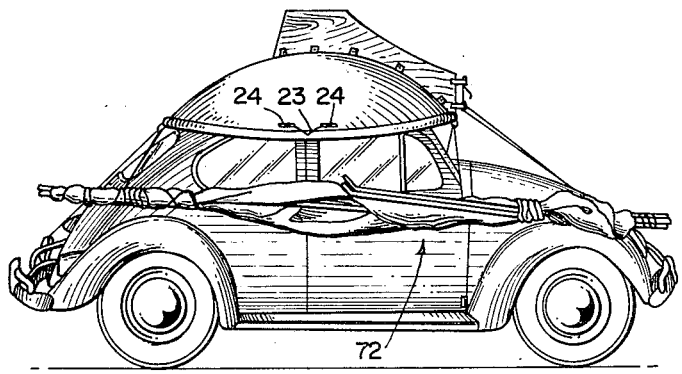
FIG. 2 shows a vehicle according to the invention partially dismantled and being carried on the roof of a Volkswagen.

The dish is formed with a rim, lip or gunwale about the perimeter, preferably by rolling over the edge of the dish as best seen in FIG. 10. The inside of the rolled-over edge forming gunwale 21 is preferably filled with foam flotation material to keep out water and aid buoyancy should the gunwale dip into the water. The circumferential edge of sheet 14 is formed with a hem defining an opening 22, best seen in FIG. 10, for accommodating a draw string 23 (FIGS. 2 and 3). Tightening the draw string gathers the hem to securely hold the edge of deck sheet 14 in substantially sealing contact with gunwale 21. The ends of draw string 23 may then be fastened to cleats 24.

A mast 25 preferably of hollow aluminum, rests upon the gunwale 21. Starboard rigid stay 26 and port rigid stay 27 help keep mast 25 firmly in place. The detail of a suitable structure for securing the bottoms of mast 25, starboard stay 26 and port stay 27 to the gunwale 21 is illustrated in FIG. 10. It is a commercially available fitting made by Alcoa. The hollow bottom portion of each member accommodates a casting 31 coaxial about and pivotally attached to an eyebolt 32 having a threaded end 33 engaging a spring clip 34. As the eyebolt 32 is rotated, it pulls spring clip 34 closer to casting 31, causing it to expand and grip the inside surface of the hollow tube tightly to keep it firmly in place.

A detail of the means for securing the starboard stay 26 and the port stay 27 to the mast 25 is shown in FIG. 11. The flattened ends of stays 26 and 27 are clamped to mast 25 by a ring clamp 35 tightened by eyebolt 36 and nut 37.

The sail 41 comprises a lateen rig and has its leading edge attached to a spar, also preferably of hollow aluminum, which is supported by a halyard passing through a pulley 44 attached to the mast 25. The bottom edge of sail 41 is attached to the boom 46, also preferably hollow tubular aluminum joined pivotally by the joint 47 to spar 42. The sheet 47 is attached at one end to an eye 51 in boom 46 and threaded through a pulley 52 tied to a cable 54 attached to a pair of eyelets 53 on gunwale 21 and then through a pulley 55.

Figure 5:
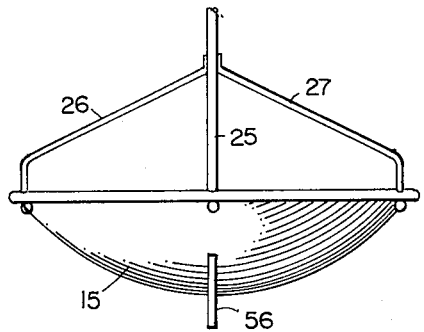
FIG. 5 is a front view of the vehicle showing a single keel and illustrating the relative position of the mast in its supports.
Figure 6:
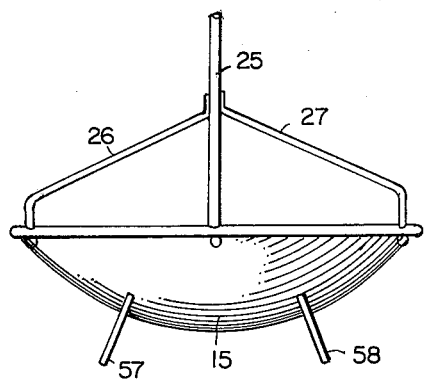
FIG. 6 is a view similar to FIG. 5 showing an alternate embodiment of the invention utilizing two keels which may also function as runners.
Figure 7:
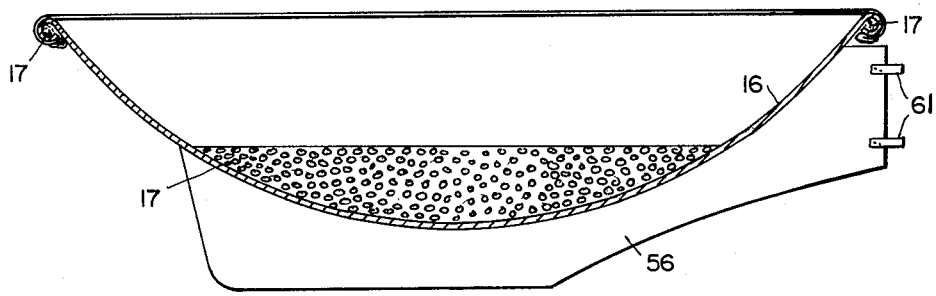
FIG. 7 is a sectional view through the center of the vehicle illustrating the foam flotation material, the keel and the means for attaching the handle shown in FIG. 8 helpful in rowing the vehicle along the beach.

A wood or metal keel 56 is secured to the bottom of the hull. When a single keel is employed as shown in FIG. 5, the keel is located in the plane including the mast 25 and bisecting the hull into two portions substantially symmetrical about that plane. When two keels are employed, as shown in FIG. 6, the keels 57 and 58 are disposed generally symmetrical about the latter plane and generally perpendicular to the convex surface 15. The structure of FIG. 6 is advantageous because the keels 57 and 58 may function as runners for ice boating.

With a symmetrical keel 56, the stern end may be fitted with eyelets 61 for receiving the downwardly pointing studs 62 attached to rudder 63, facilitating easy insertion and removal of the rudder. Rudder 63 includes a tiller 64 sufficiently long so that the sailor 13 can easily control the rudder setting by moving the tiller 64 and the setting of the sail by controlling the sheet 47 as shown in FIG. 1.

With the double keel structure shown in FIG. 6, suitable means (not shown) may be clamped to the stern portion of the gunwale for accommodating a rudder.

Figure 8:
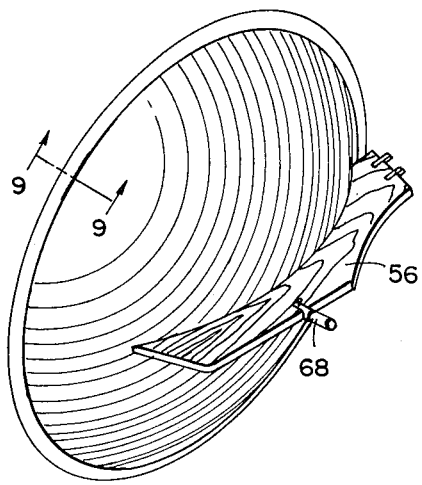
FIG. 8 illustrates the dish-like hull and attached keel with a handle attached for rolling the hull along the beach.
Figure 9:
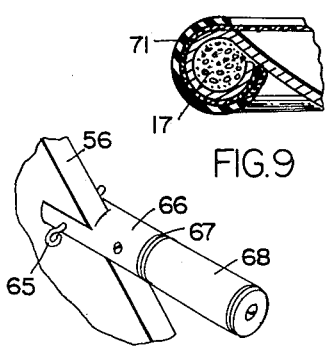
FIG. 9 shows a detail of how the flexible covering fabric overlaps the lip and is in turn covered by the U-shaped means functioning as a tire and bumper.
Figure 12:
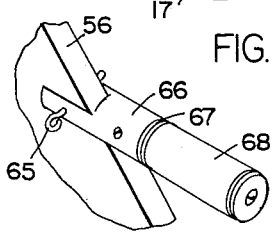
FIG. 12 shows a detail of means attaching the handle to the keel.

Referring to FIG. 8, there is shown the dish alone with the rigging and rudder removed and the keel 56 formed with an opening to receive the screweye after handle 67 has been coupled to the keel by means including the slotted tube 66 pivotally attached to handle 67 having a gripping sleeve 68, as best seen in FIG. 12. Under these conditions, the dish may be rolled on the rim or gunwale 21 covered by a tire-like member 71 of generally U-shaped cross section which fits over the deck sheet 14 and the rim, holding tightly to gripping sleeve 68 while allowing the internal shaft secured to slotted tube 66 to spin.

It is thus relatively easy for a single person to carry the rigging 72 (FIG. 2) and rudder 63 over his shoulder while rolling the structure of FIG. 8 along the beach. The assembly of FIG. 8 may then be inverted over the roof of a small car, such as a Volkswagen, as shown in FIG. 2, the deck sheet 14 functioning to prevent damaging the roof of the automobile. The rigging 72 may then be carried along the side of the car as shown and the rudder carried inside or in the trunk. It is thus seen that no elaborate or expensive trailers are required to move the vehicle from place to place while permitting complete visibility for safe driving. For larger automobiles, the hull may be carried on the roof with or without using a rack.

An actual embodiment of the invention substantially as described herein has been transported and sailed many times and proved to have many advantageous and useful properties in addition to those discussed above. By grasping the lower portion of the mast 25, it is easy for one person to pull the vessel through heavy surf relatively easily and without upsetting the vessel. Locating the mast on the gunwale as shown makes available virtually the entire area of the deck sheet 14 for accommodating passengers. Two passengers may ride side by side comfortably without having to lean over the gunwale, even when sailing in relatively strong winds. This feature is believed to be a result of the wide beam and the symmetry of the hull. And the flexible sheet 14 functions to provide an air-cushioned deck, requiring no additional pillows. Making the deck and keel detachable facilitates shipping the hulls in stacked relationship to minimize shipping costs.

An actual embodiment of the invention comprises aluminum 3/32" thick forming a spun hull six feet in diameter and 18" deep. The mast height is nine feet. The boom and spar are each 12 feet long. Each stay is about four feet long and is about 26" above the gunwale. The sail area is 60 square feet. The total weight of the sailing vessel is about 50 pounds.

The specific form of the hull may take numerous different forms, such as being of ellipsoidal or ogival cross section in the horizontal plane. The sailing rig may be removed and the invention used as a child's paddleboat.

It is apparent that those skilled in the art may now make numerous other modifications of, uses of and departures from the specific embodiments described herein without departing from the inventive concepts. Consequently, the invention is to be construed as limited solely by the spirit and scope of the appended claims.

What is claimed is:

1. A vehicle comprising, means defining a hull of elliptical cross section in its normally horizontal plane having a convex outside face, an inside concave face and a circumferential lip defining a gunwale at the perimeter of said convex face, a flexible deck sheet of material covering the opening exposing said inside concave face for supporting passengers above said hull, means for securing the perimeter of said sheet over said gunwale separated from said concave face by said gunwale so that the weight of objects on said sheet toward said concave face increases the pressure exerted on said lip by the edge of said sheet, at least one planar keel member generally perpendicular to said convex outside face outside the volume enclosed by said hull and said sheet, mast means extending from said gunwale substantially symmetrical about a plane perpendicular to and bisecting said deck sheet which plane includes the normal fore-aft axis of said vehicle, a sail, and means including said mast means for supporting said sail in a position for receiving wind to move said vehicle, said deck sheet, said hull and said means for securing coacting to define a substantially fluid tight volume within said sheet and said hull.

2. A vehicle in accordance with claim 1 and further comprising rudder means extending away from said convex face substantially in a said bisecting plane at the end of said hull defining means away from where said mast means extends from said gunwale.

3. A vehicle in accordance with claim 1 and further comprising, means functioning as a tire and bumper of generally U-shaped cross section fitting over said sheet edge and said lip.

4. A vehicle in accordance with claim 1 wherein said hull is formed circularly symmetric about an axis substantially perpendicular to said deck sheet.

5. A vehicle in accordance with claim 4 wherein said hull is formed of spun metal.

6. A vehicle in accordance with claim 1 wherein said gunwale comprises the edge of said hull turned over to form said lip, and said means for securing comprises a draw string in a hem around the edge of said sheet tightened under said lip.

7. A vehicle in accordance with claim 1 wherein said mast means comprises, a normally vertical mast extending from a first point on said gunwale including said bisecting plane, and a pair of substantially rigid stays extending between said mast above said gunwale to respective points on said gunwale on opposite sides of said bisecting plane.

8. A vehicle in accordance with claim 7 and further comprising a spar for supporting said sail, means for suspending said spar from said vertical mast, and a generally horizontal boom secured to the lower leading edge of said spar.

9. A vehicle in accordance with claim 8 and further comprising, rudder means substantially in said bisecting plane outside and extending below said hull, keel means attached to and below said hull, and said sail extends between and secured to said generally horizontal boom and said spar.

10. A vehicle in accordance with claim 8 and further comprising, a pair of keel means attached to and below said hull on opposite sides of said bisecting planes for supporting said vehicle on ice and stabilizing said vehicle in water, and said sail extends between and secured to said generally horizontal boom and said spar.

11. A vehicle comprising,
means defining a hull having a convex outside face, an inside concave face and a circumferential lip defining a gunwale at the perimeter of said convex face,
a flexible deck sheet of material covering the opening exposing said inside concave face for supporting passengers above said hull,
means for securing the perimeter of said sheet over said gunwale separated from said concave face by said gunwale so that the weight of objects on said sheet toward said concave face increases the pressure exerted on said lip by the edge of said sheet,
and handle means pivotally attached to the center of said convex face for applying forces to said vehicle causing it to translate while rolling on the said lip.

References Cited in the file of this patent
UNITED STATES PATENTS

| | | |
|---|---|---|
| 2,140,250 | Schlumpf | Dec. 13, 1938 |
| 2,364,578 | Wilkie | Dec. 5, 1944 |
| 2,584,884 | Kirby | Feb. 5, 1952 |
| 2,712,293 | O'Higgins | July 5, 1955 |
| 2,720,664 | Gray | Oct. 18, 1955 |
| 2,764,765 | Woodruff | Oct. 2, 1956 |
| 2,826,163 | King | Mar. 11, 1958 |
| 2,826,423 | Erickson | Mar. 11, 1958 |
| 2,995,104 | Mills | Aug. 8, 1961 |
| 3,080,584 | Brown | Mar. 12, 1963 |